(No Model.)
H. E. PRIDMORE.
GRAIN ADJUSTER FOR SELF BINDING HARVESTERS.
No. 435,522.  Patented Sept. 2, 1890.
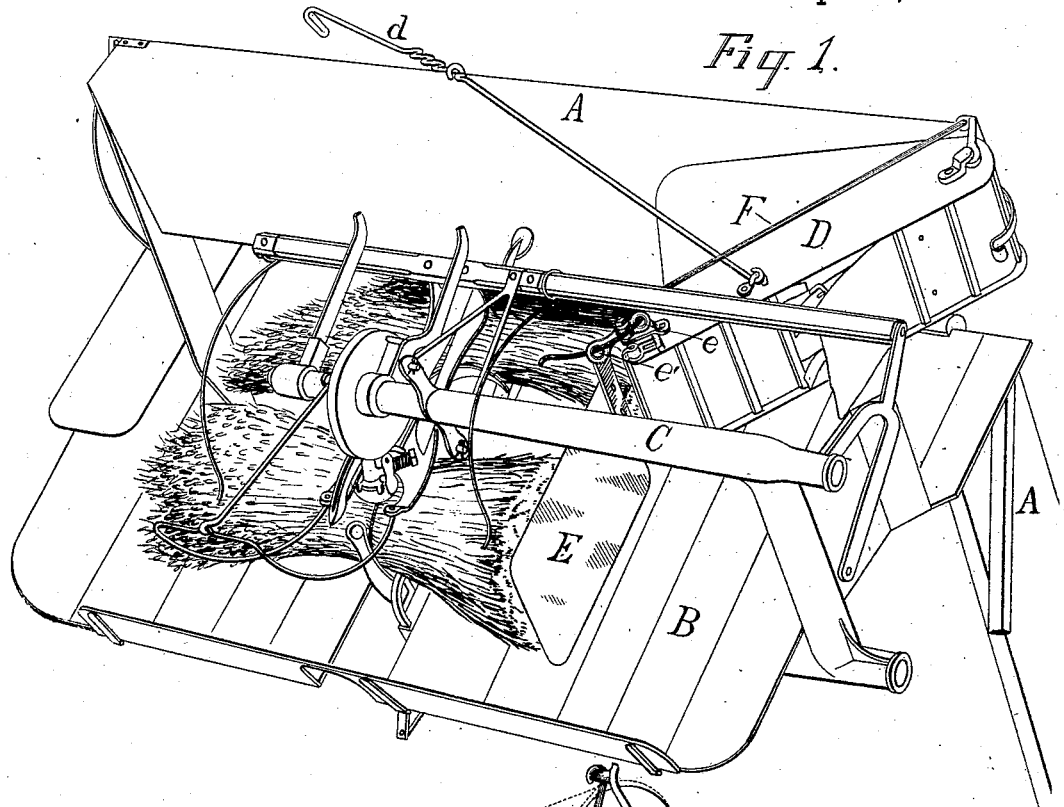
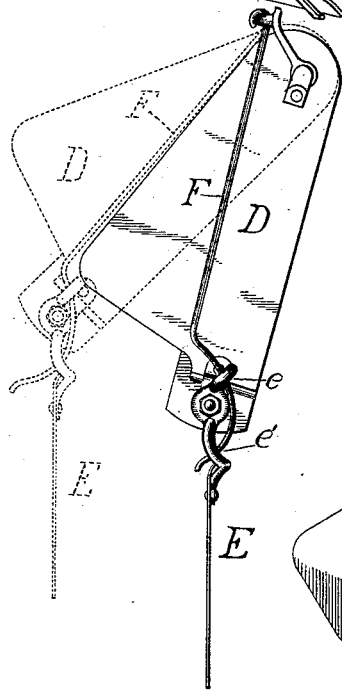
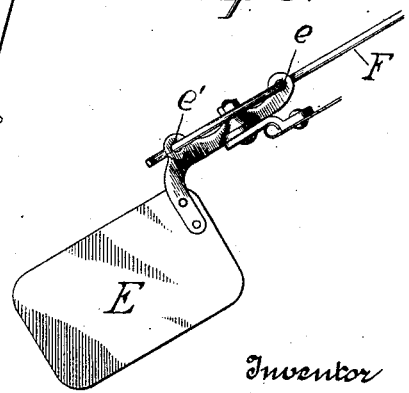
Witnesses
J. M. Culver.
F. A. Ericsson.
Inventor
Henry E. Pridmore
By his Attorney R. B. Swift.

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

GRAIN-ADJUSTER FOR SELF-BINDING HARVESTERS.

SPECIFICATION forming part of Letters Patent No. 435,522, dated September 2, 1890.

Application filed May 31, 1890. Serial No. 353,781. (No model.)

*To all whom it may concern:*

Be it known that I, HENRY E. PRIDMORE, a citizen of the United States, residing at Chicago, in the county of Cook and State of Illinois, have invented certain new and useful Improvements in Grain-Adjusters for Self-Binding Harvesters, of which the following is a specification.

At the present time the binding attachment in self-binding harvesters is not only fitted to move bodily along the end of the harvester to accommodate itself to long and short grain, but there is such a great difference in the length of grain that the adjuster with which all self-binding harvesters are now provided primarily to hurry along the lagging butts of the grain has to be moved at its delivery end back and forth, thus deflecting the stream of grain centrally to the binder. The combined movement of the binding attachment forward and the adjuster rearward leaves a large open space between the binder-frame and the end of the adjuster into which the grain is liable to slip as the machine is being jolted over rough ground and to escape from the band, or if caught to form an unevenly-butted bundle. To remedy this slipping forward of the grain, I pivotally attach an extension to the end of the adjuster and control its position as the adjuster is moved back and forth, so that it will always remain at a right angle to the path of the machine and against the butts of the grain by a rod attached to the frame of the harvester and suitably curved and passed through the extension.

In the accompanying drawings, which illustrate my invention, Figure 1 is a perspective view of part of the elevator and binder attachment of a self-binding harvester, showing the action of the adjuster and extension upon the grain. Fig. 2 is a top view of the adjuster, its extension, and controlling rod, while the dotted lines show the position of the parts when the delivery end of the adjuster has been drawn toward the rear of the binding attachment; and Fig. 3 is a front view of the extension, particularly showing the manner of passing the controlling-rod through it.

Similar letters refer to similar parts throughout the several views.

The elevator A, the deck or binder-platform B, the frame C, and the adjuster D are parts of a self-binding harvester, such as are in common use. The adjuster D is pivoted to the frame of the harvester and is swung back and forth by the rod $d$, attached thereto and extended convenient for the driver. To the delivery end of the adjuster D, I pivot the extension E, making the faces of the pivot-bearing broad, so that the extension E will not rock. In the extension E are the holes $e$ and $e'$, through which the curved portion of the rod F freely passes as the adjuster is moved back and forth. The rod F is pivotally fastened to the frame of the harvester at its other end at any convenient place, the form of the curve being changed to keep the extension parallel with the butts of the bundle, except that it must be attached at some point outside of the pivotal connection of the adjuster. The reason for this is that the extension is kept parallel by the form of the curved portion of the rod F as it passes through the holes $e$ and $e'$, and if the rod had the same pivot as the adjuster it would have no movement through it. In order that the rod F may freely pass through the holes $e$ and $e'$ the faces of the extension at the holes are nearly at a right angle to each other. However, the form of these holes is not essential to my invention.

I am aware that extensions are old as well as means for keeping them parallel with the butts of the grain, and I do not therefore claim such, broadly; but What I do claim as my invention, and desire to secure by Letters Patent, is—

In a self-binding harvester, the combination of an adjuster, an extension pivoted thereto, a controlling-rod attached to the frame of the harvester at one end and curved at the other end, its curved portion passing through bearings in the extension and freely sliding therein when the adjuster is moved back and forth, substantially as and for the purpose specified.

HENRY E. PRIDMORE.

Witnesses:
JOHN V. A. HASBROOK,
J. M. CULVER.